(12) United States Patent
Moritz et al.

(10) Patent No.: US 8,123,351 B2
(45) Date of Patent: *Feb. 28, 2012

(54) EYEGLASS COMPONENT MOUNTING SYSTEM

(75) Inventors: Hans Karsten Moritz, Foothill Ranch, CA (US); Mark Bu, Aliso Viejo, CA (US); Errol Tazbaz, Mission Viejo, CA (US); An Tran, Austin, TX (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,910

(22) Filed: Jan. 6, 2011

(65) Prior Publication Data

US 2011/0102733 A1    May 5, 2011

Related U.S. Application Data

(63) Continuation of application No. 12/395,500, filed on Feb. 27, 2009, now Pat. No. 7,874,669.

(51) Int. Cl.
*G02C 5/14* (2006.01)
(52) U.S. Cl. ............ 351/119; 351/52; 351/158
(58) Field of Classification Search ............ 351/41, 351/51, 52, 111–123, 158
See application file for complete search history.

(56) References Cited

U.S. PATENT DOCUMENTS

| | | | |
|---|---|---|---|
| 2,482,195 A | 9/1949 | Martin | |
| 4,806,008 A * | 2/1989 | Tarloff | ............... 351/51 |
| 4,877,320 A | 10/1989 | Holden | |
| 5,185,620 A | 2/1993 | Cooper | |
| 5,583,584 A | 12/1996 | Friedman | |
| 6,540,347 B1 | 4/2003 | Radziwon et al. | |
| 6,957,890 B2 | 10/2005 | Shapiro | |
| 7,261,409 B1 | 8/2007 | Taber | |
| 7,467,866 B2 | 12/2008 | Chao | |
| 7,530,688 B2 | 5/2009 | Grogan et al. | |
| 7,874,669 B2 * | 1/2011 | Moritz et al. | ............... 351/119 |

(Continued)

FOREIGN PATENT DOCUMENTS

| | | |
|---|---|---|
| FR | 1160007 | 7/1958 |
| WO | WO 2007/068808 | 6/2007 |
| WO | WO 2008/082718 | 7/2008 |

OTHER PUBLICATIONS

"Fashionable Eyewear Charms to add Color, Style & Fun to Eyeglass Frames". Ficklets—Eyewear Charm Huggers. http://www.ficklets.com. Jul. 22, 2009.

(Continued)

*Primary Examiner* — Huy K Mai
(74) *Attorney, Agent, or Firm* — Knobbe Martens Olson & Bear, LLP (57) ABSTRACT

An eyeglass component mounting system is provided that can comprise a frame and at least a first ear stem. The first ear stem extends rearwardly from the frame and defines an anterior end and a posterior end. The anterior end of the first ear stem can be hingedly coupled to the frame such that the first ear stem can be pivotably movable between a stowed position and a deployed position. The first ear stem can comprise a mounting area configured to receive an eyewear component thereon such that the eyewear component can be removed or seated onto the mounting area when the first ear stem is in the stowed position and such that the eyewear component is retained on the mounting area when the first ear stem is in the deployed position.

33 Claims, 8 Drawing Sheets

U.S. PATENT DOCUMENTS

| | | |
|---|---|---|
| 2002/0170147 A1 | 11/2002 | Heller |
| 2006/0023158 A1 | 2/2006 | Howell et al. |
| 2006/0187404 A1 | 8/2006 | Ifergan |
| 2007/0013863 A1 | 1/2007 | Zelazowski |
| 2007/0046887 A1 | 3/2007 | Howell et al. |
| 2007/0222940 A1 | 9/2007 | Cohen |
| 2008/0165317 A1 | 7/2008 | Wilson |
| 2008/0239232 A1 | 10/2008 | Guerrero |
| 2008/0284974 A1 | 11/2008 | Siu |
| 2009/0122253 A1 | 5/2009 | Clay |
| 2010/0002186 A1* | 1/2010 | Zelman .......................... 351/52 |
| 2011/0080555 A1 | 4/2011 | Chow |

OTHER PUBLICATIONS

International Preliminary Report on Patentability and Written Opinion received in corresponding PCT Application No. PCT/US2010/021044, Date of Issuance: Aug. 30, 2011 in 9 pages.

* cited by examiner

EYEGLASS COMPONENT MOUNTING SYSTEM

CROSS-REFERENCE TO RELATED APPLICATIONS

This application is a continuation of U.S. application Ser. No. 12/395,500, filed Feb. 27, 2009, the entirety of which is hereby incorporated herein by reference.

BACKGROUND

1. Field of the Inventions

The present inventions relate generally to mounting systems for eyewear. More specifically, the present inventions relate to methods and apparatuses for mounting an ornamental or functional component to an eyeglass frame.

2. Description of the Related Art

The eyewear industry has developed countless eyeglass designs. Some of these designs provide not only optical performance, but additional functionality. Fashion trends in eyewear have drifted in recent years from leaner, wiry versions to those that are larger, wider, and often more highly decorated with ornamentation.

In addition to the designer trend, sport and casual eyewear has also begun incorporating additional functionality and gadgetry. For example, many eyewear products now provide on-board electronics that provide Bluetooth or MP3 functionality.

Notwithstanding the foregoing, there remains a need for a releasable attachment system that enables the easy attachment and release of secondary components to an underlying eyeglass frame.

SUMMARY

The present application discloses various new mechanisms, eyewear products, pairing tools, and methods that will further revolutionize the eyewear industry. For example, implementations of some of the embodiments disclosed herein enable a wearer to personally customize and manipulate their eyeglasses with any of a variety of selected eyewear components, such as ornamental emblems and structures, and electronic or other functional components, to name a few.

Presently in the eyewear industry, a consumer may select preassembled eyeglasses having any of a variety of designs, colors, components, or other features. While this provides a pseudo customized final product, the eyeglasses typically cannot be further manipulated or modified after delivery to the consumer. One exception are the eyeglasses that allow the consumer to remove and replace the lenses and/or nosepiece of the eyeglasses. Nevertheless, there is a need in the art for a modular system that enables eyeglasses to be uniquely and/or repeatedly modified based on the wearer's preference.

An eyeglass component mounting system is provided herein, that comprises an eyeglass and a releasable component. The eyeglass can comprise at least one ear stem and a lens support which will be referred to as a frame. The ear stem can be hingedly connected to the frame to define a stowed position and a deployed position. The ear stem can comprise at least one moveable portion and a stationary portion. The stationary portion can be connected to the frame with the moveable portion being moveably connected to the stationary portion. The movable portion can be moveable between a locking position and a releasing position. The ear stem can comprise a retention zone formed by the moveable portion and the stationary portion.

In such an embodiment, the releasable component can be receivable in the retention zone of the ear stem. For example, the releasable component can be retained in the retention zone of the ear stem when the moveable portion is in the locking position. Further, the releasable component can be moveable into or out of the retention zone of the ear stem when the moveable portion is in the releasing position.

The eyeglass can be configured such that the moveable portion can be maintained in the locking position when the ear stem is in the deployed position. Further, the moveable portion can comprise an engagement surface and the frame can comprise an abutment surface. The engagement surface can contact the abutment surface to maintain the moveable portion in the locking position when the ear stem is in the deployed position. Additionally, the movable portion can be configured with the engagement surface contacting the abutment surface when the moveable portion is in the releasing position and the ear stem is in the stowed position. Further, upon movement of the ear stem from the stowed position to the deployed position, the engagement surface can contact the abutment surface such that the moveable portion is urged from the releasing position toward the locking position.

In some implementations, the movable portion can be slidable relative to the ear stem. Further, the stationary portion can be attached to the frame. In such an embodiment, it is contemplated that the stationary portion can comprise a backbone element that is attached to the frame. The backbone element can engage the moveable portion of the ear stem for permitting slidable movement of the moveable portion relative to the stationary portion of the ear stem.

In another implementation, the moveable portion may include a first engagement element and the stationary portion can include a second engagement element. The releasable component can further comprise third and fourth engagement elements. The first engagement element of the moveable portion is connectable to the third engagement element of the releasable component and the second engagement element of the stationary portion is connectable to the fourth engagement element of the releasable component when the releasable component is disposed in the retention zone of the ear stem and the moveable component is in the locking position.

In accordance with another embodiment, an eyeglass component mounting system is provided that comprises a frame, at least a first lens, and at least a first ear stem. The frame can define at least one lens support. Further, the first lens can be supported by the lens support. The first ear stem can extend rearwardly (posteriorly) from the frame and define an anterior end and a posterior end. The anterior end of the first ear stem can be hingedly coupled to the frame. The first ear stem can be movable between a stowed position and a deployed position. The first ear stem can comprise a mounting area configured to receive an eyewear component thereon such that the eyewear component can be removed or seated onto the mounting area when the first ear stem is in the stowed position and such that the eyewear component is retained on the mounting area when the first ear stem is in the deployed position.

In some implementations, the eyeglass component mounting system can further comprise an eyewear component. The eyewear component can be a decorative ornament. Further, the eyewear component can be an electronic module. For example, the electronic module can comprise at least one of a memory storage module, a battery, and a transceiver. Additionally, the eyewear component can comprise a cover configured to enclose a compartment formed along the first ear stem.

Further, an anterior end of the eyewear component can abut the frame when the first ear stem is in the deployed position such that the eyewear component is retained on the first ear stem. The eyewear component can comprise an engagement portion and the first ear stem comprises an engagement structure. In this regard, the engagement portion of the eyewear component can be interconnectable with the engagement structure of the first ear stem when the first ear stem is in the stowed position. The engagement portion can be slidable along the first ear stem in a posterior direction until engaging the engagement structure of the first ear stem and can be releasable from the engagement structure upon anterior movement along the first ear stem.

Additionally, the mounting area of the first ear stem can comprise an engagement structure. The engagement structure can be configured to interconnect with a portion of the eyewear component when the eyewear component is seated onto the mounting area.

Further, the first ear stem can comprise a movable portion. The movable portion can be attached to the first ear stem and can be translatable along the first ear stem to define an open configuration and a closed configuration. The open configuration can facilitate seating of the eyewear component onto the mounting area. Further, the closed configuration can provide retention of the eyewear component in the mounting area.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

While the present description sets forth specific details of various embodiments, it will be appreciated that the description is illustrative only and should not be construed in any way as limiting. Additionally, it is contemplated that although particular embodiments of the present inventions may be disclosed or shown in the context of unitary or dual lens eyewear systems, such embodiments can be used in both unitary and dual lens eyewear systems. Further, it is contemplated that although particular embodiments of the present inventions may be disclosed or shown in the context of frames having full orbitals, such embodiments can be used with frames having both full and partial orbitals or rimless frames. Furthermore, various applications of such embodiments and modifications thereto, which may occur to those who are skilled in the art, are also encompassed by the general concepts described herein.

Moreover, although the present description may set forth examples of embodiments incorporating certain aesthetic or functional components, the present inventions contemplate the use of any type of present or future decorative or functional (e.g. electronic) components with eyeglasses. Further, the interchangeability and customization of embodiments can be permanent or temporary. Furthermore, one or more components can be integrated into visible or hidden portions of the eyeglass. For example, a component may be attached to either the inner (medial) or outer (lateral) face of an ear stem or frame of the eyeglasses.

As noted above, various eyewear designs have been provided to suit the needs and preferences of consumers. However, according to at least one of the embodiments disclosed herein is the realization that an eyewear product can be provided that enables a wearer to selectively modify or personalize their eyeglasses to comprise any variety of decorative and/or electronic components. Further, in accordance with another of the embodiments disclosed herein is the realization that a wearer should preferably be able to easily modify their eyeglasses and obtain desirable results.

In this regard, it is contemplated that any aesthetic or functional modifications to the eyeglasses preferably does not affect the stability or optical quality of the eyeglasses. For example, a component preferably is not only easily incorporated into the eyeglass, but is preferably securely retained by the eyeglass. Therefore, in order to address such concerns, as well as other disadvantages of the prior art, the present application sets forth various embodiments and disclosure relating to a customizable eyeglass that allows a wearer to modify at least one aesthetic and/or functional quality thereof while maintaining superior performance and fit of the eyeglass.

For example, some embodiments disclosed herein provide an eyeglass comprising a frame and an ear stem attached to the frame. In some embodiments, the ear stem can be hingedly attached to the frame. Further, at least one of the frame and the ear stem can be configured to receive a component. The component can be a decorative component or a functional component, such as an electronic component. In this regard, the component can be removed and replaced by the wearer of the eyeglasses in order to customize or personalize the eyeglasses.

In some embodiments wherein the ear stem is hingedly attached to the frame, the hinged articulation of the ear stem can provide one or more ear stem positions or structural arrangements that enable a component to be attached to the ear stem.

For example, it is contemplated that the hinged articulation of the ear stem can cause an anterior end of the ear stem, which is attached to the frame, either to be exposed or to abut the frame. Further, when the anterior end of the ear stem abuts the frame, the ear stem will generally be held in place because the eyeglasses are being worn by a wearer. Accordingly, some embodiments utilize the hinged articulation of the ear stem to facilitate coupling of a component along an anterior portion of the ear stem and to facilitate retention of the component when the anterior end of the ear stem abuts the frame. In this manner, the wearer can modify the appearance or function of the eyeglasses when the eyeglasses are not being worn and have confidence that the component or modified eyeglasses will be secured during use.

Some of the embodiments disclosed herein enable a wearer to remove and replace ornamental features of the eyeglass. In some implementations, the wearer can remove and replace minor or major parts of the ear stem. For example, the wearer can remove and replace discrete decorative emblems disposed along one or more of the ear stems of the eyeglass. In another example, the wearer can remove and replace a length or portion of the ear stem. The length or portion can be a visible or hidden portion of the eyeglasses. The wearer can thereby make minor or major modifications to the eyeglasses to customize the eyeglasses. In this manner, the wearer is given the ability to change the appearance and character of their eyeglasses, as they desire.

Additionally, other embodiments disclosed herein enable a wearer to remove and replace any variety of electronic components of the eyeglass. Some of the components that may be replaced can include items such as batteries, speakers, transceivers, heads-up displays, and storage components, including memory cards and other electronic hardware.

For example, a wearer may remove a memory card stored on an ear stem of the eyeglasses and replace the memory card with another memory card having desired music or video files stored thereon. Additionally, the wearer can replace a battery with a fresh battery. Moreover, it is contemplated that such eyewear products can allow the wearer to add or supplement other hardware with radio components, receivers, transmitters, or transceivers, Bluetooth components, GPS components, heads-up displays, and any other of a variety of electronic hardware components. In this regard, the capabilities of such embodiments provide for increased functionality as additional improvements are made in the personal electronics industry.

In yet other embodiments, a uniquely configured eyeglass is provided that enables one or more ornamental or electronic components to be removably mounted onto one or more sections of the eyeglass. The eyeglass can comprise a frame, a pair of ear stems, and one or more attachment portions that can be used to secure a component onto the eyeglass. The attachment portion can be stationary or movable relative to the eyeglass. The attachment portion can be disposed on the frame or the ear stems of the eyeglass.

Further, the attachment portion can be configured such that the wearer can remove and replace a component when the eyeglasses are not being worn. For example, a wearer typically folds or pivots the ear stems toward each other (into a stowed position) when the eyeglasses are not in use and folds or pivots the ear stems away from each other (into a deployed position) when the eyeglasses are going to be worn on the head. In some embodiments, such movement of the ear stem to and from the stowed and deployed positions can situate the attachment portion in an open configuration or a closed configuration. Thus, the attachment portion can be in an open configuration when the ear stem is moved toward the stowed position. Further, the attachment portion can be in a closed configuration when the ear stem is in the deployed position. In this regard, the open configuration can be achieved once the ear stem is moved from the deployed position toward the stowed position. In other words, the stowed position can refer to any position other than the deployed position when a first ear stem is fully pivoted to its limit away from a second ear stem.

Furthermore, the attachment portion can also be configured such that a component is retained by the attachment portion when the ear stem is in the deployed position. In other words, in some embodiments, the attachment portion can be moved to a closed configuration when the ear stem is folded or pivoted away from the other ear stem such that the eyeglasses are in a wearable configuration. Thus, the abutment of an anterior end of the ear stem with the frame of the eyeglass can cause the attachment portion to be in a closed configuration.

In this matter, various embodiments disclosed herein can allow the wearer to modify a component of the eyeglass when the eyeglass is not being worn, but to retain the component when the eyeglasses are being worn. Additionally, some embodiments, one or more components can be removable and/or replaceable with respect to one or more of the ear stems or the frame. Thus, in some embodiments, a single ear stem may be configured to accommodate the removal and/or replacement of one or two or more components thereon. In other embodiments, both ear stems may be configured to accommodate the removal and/or replacement of one or two or more components thereon. Further, in yet other embodiments, the frame may be configured to accommodate the removal and/or replacement of one or two or more components thereon. Finally, in yet other embodiments, both the frame and one or more of the ear stems may be configured to accommodate the removal and/or replacement of one or two or more components thereon.

For example, an embodiment of the eyeglasses can be configured to comprise a frame and a pair of ear stems coupled to the frame. The ear stems can be pivotably mounted to the frame such that the ear stems can be positioned in a stowed position or a deployed position. One or both of the ear stems can comprise an attachment portion. The attachment portion of the ear stem can define an open position and a closed position. When in the open position, the attachment portion can allow the component to be removed or replaced, and when in the closed position, the attachment portion can retain the component.

In some embodiments, the attachment portion can comprise a backbone element which extends along the length of at least the mounting area and may extend the length of the ear stem. The backbone element can define a mounting area onto which one or more components or ear stem portions can be mounted. In some embodiments, the backbone element can be a narrowed portion of the ear stem.

The backbone element can be configured such that one or more portions of the ear stem slide along the backbone element. In this regard, when the attachment portion is in the open position, the slidable portion of the ear stem can be permitted to slide or move relative to the backbone element. Further, when in the closed position, the slidable portion of the ear stem can be retained in place relative to the backbone element.

For example, the backbone element can be coupled to the frame at an anterior end thereof and coupled to an ear support at a posterior end thereof. One or more portions of the ear stem can be slidably mounted on the backbone element such that the slidable portions of the ear stem can be translated along the length of the backbone element without detaching from the backbone element. In such an embodiment, the slidable portion of the ear stem can be moved from a posterior position to an anterior position in order to allow a component to be seated onto the backbone element. When the component is seated onto the backbone element, the slidable portion of the ear stem can be moved toward the posterior position in order to retain the component in its seated or mounted position.

In another embodiment, the attachment portion can be configured without slidable portions of ear stem. For example, a component can be initially seated onto the backbone element for mounting thereon when the ear stem is moved toward the stowed position. The backbone element can comprise one or more engagement structures, such as protrusions or grooves, which can interact with corresponding engagement structures of the component when the component is initially seated onto the backbone element. In such an embodiment, the component can be removed and/or seated onto the backbone element when the ear stem is moved toward the stowed position. However, the component can be retained on the backbone element when the ear stem is in the deployed position. Thus, the component can be securely mounted on the ear stem when the eyeglasses are worn.

Figure 1:
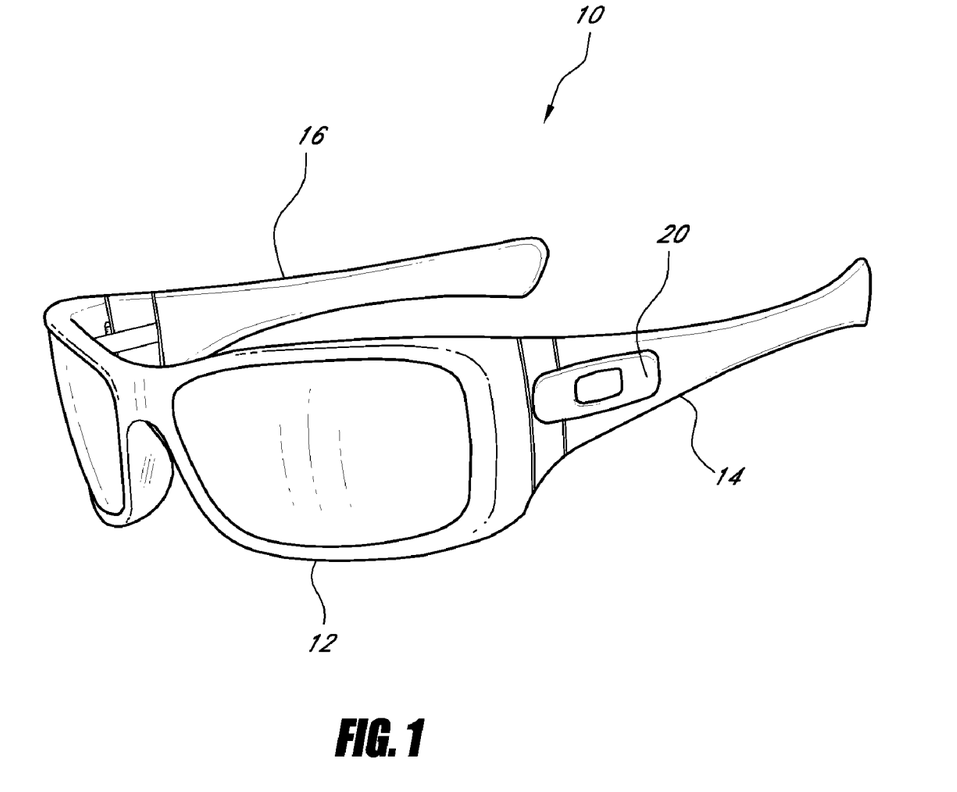
FIG. 1 is a perspective view of an eyeglass in accordance with an embodiment of the present inventions.

Referring now to the figures, wherein embodiments are shown for purposes of illustrating features of the present inventions, and not for limiting the same, FIG. 1 illustrates an embodiment of an eyeglass 10 prepared in accordance with an aspect of the present inventions. The eyeglass 10 can comprise a frame 12, a first ear stem 14, and a second ear stem 16. The embodiment of the eyeglass 10 illustrated in FIG. 1 can also comprise a decorative component 20.

Figure 2:
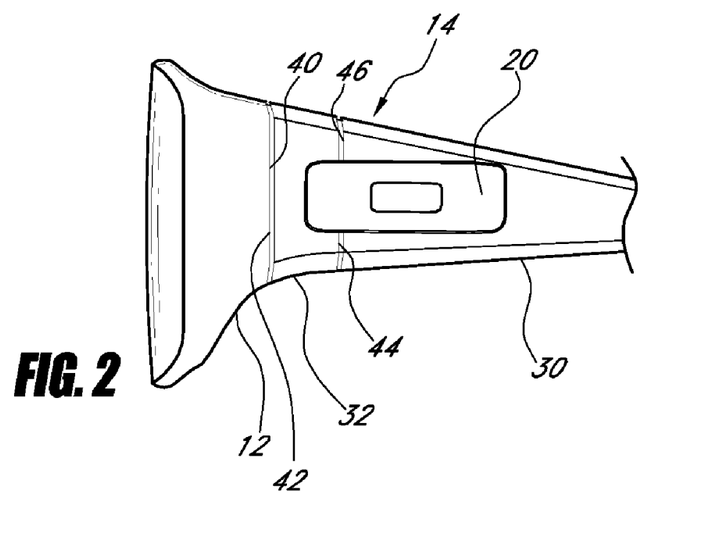
FIG. 2 is a left side view of an ear stem of the eyeglass of FIG. 1.
Figure 3:
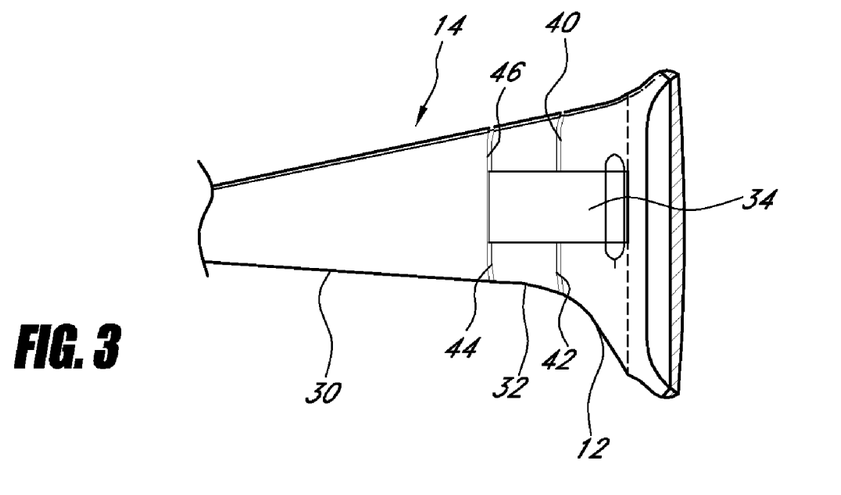
FIG. 3 is a right side view of the ear stem shown in FIG. 2.

FIGS. 2 and 3 illustrate left and right side views of the first ear stem 14 of the embodiment illustrated in FIG. 1. Additionally, FIGS. 4A-5C illustrate mechanical operation of a mechanically-operative embodiment of the first ear stem 14. The mechanical operation shown with respect to the first ear stem 14 can also be applied to the second ear stem 16 in some embodiments. Therefore, teachings with respect to the first ear stem 14 may also be utilized with respect to the second ear stem 16. However, it is contemplated that only one of the ear stems may incorporate the mechanical operations illustrated and described. Finally, in other embodiments, it is contemplated that the ear stems can incorporate different mechanical attachment structures, operations or features. Thus, the teachings and disclosure herein can enable one of skill to modify the frame or the ear stems to incorporate mechanical operations and features to provide a desirable product.

Referring again to FIGS. 2 and 3, the first ear stem 14 can comprise a first portion such as a stationary portion 30 and a second portion such as a movable portion 32. As shown in FIG. 3, the movable portion 32 can be rigidly or movable associated with a backbone element 34 that is attached to the frame 14. For example, the backbone element 34 can be hingedly attached to the frame 14.

Figure 5A:
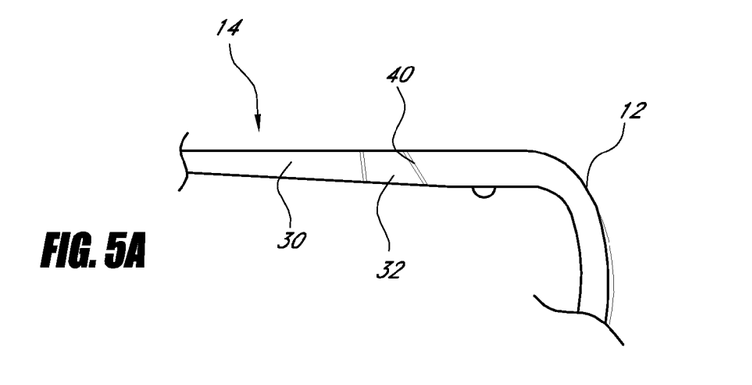
FIG. 5A is a top view of the ear stem shown in FIG. 4A.
Figure 5B:
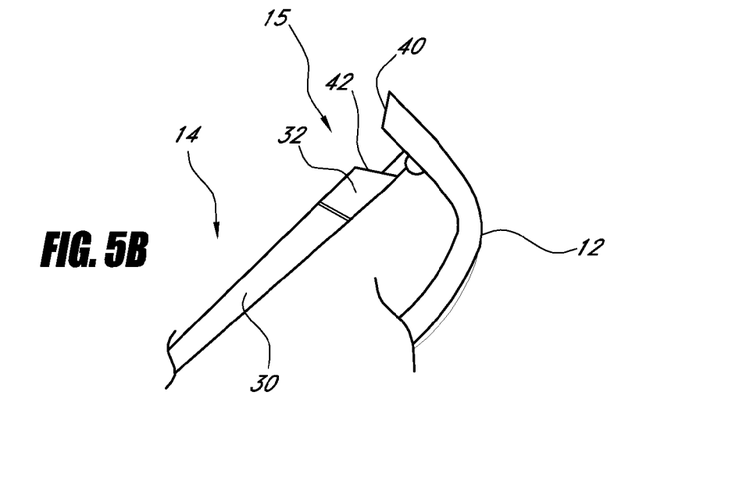
FIG. 5B is a top view of the ear stem shown in FIG. 4B.
Figure 5C:
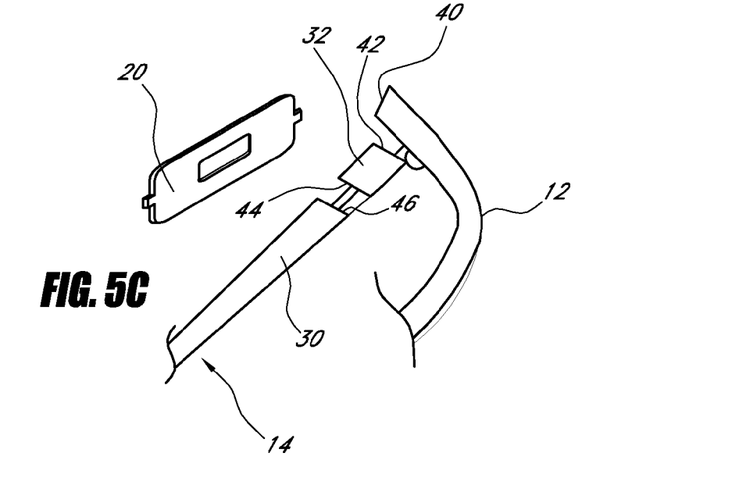
FIG. 5C is a top view of the ear stem shown in FIG. 4C.

As illustrated in FIG. 3, and as also shown in the top views in FIGS. 5A-C, the frame 12 can comprise a posterior surface or portion 40 that faces rearwardly or posteriorly from the orbitals of the frame 12. In this regard, the frame 12 can comprise first and second sides that interconnect with the respective ones of the first ear stem 14 and the second ear stem 16. Accordingly, both the first and second sides of the frame 12 can comprise respective posterior surfaces or portions.

The posterior surface 40 can be configured to abut at least a portion of an anterior end 15 of the first ear stem 14. In the embodiment shown in FIGS. 1-5C, the anterior end 15 can include an anterior end 42 of the movable portion 32. However, in other embodiments, the anterior end can be an anterior end of the stationary portion 30. As described further herein, the abutment of the posterior surface 40 with an anterior end of the ear stem 14 can accomplish various functions and provide unique advantages over the prior art. For example, the abutment of the posterior edge 40 of the frame 12 with the anterior end 42 of the movable portion 32 can fix the relative position of the movable portion 32 relative to the stationary portion 30 in order to thereby retain the decorative component 20 or another component locked in place, as will be described further below. Further, as described below, the surface 40 can serve to position the movable portion 32 such that the movable portion 32 and engages the component 20 when the eyeglass 10 is worn.

In the embodiment shown in FIGS. 1-5C, the movable portion 32 may comprise an anterior end 42 and a posterior end 44. As shown, where the first ear stem 14 is in the deployed (as worn) position, the anterior end 42 of the movable portion 32 can be positioned adjacent the posterior surface 40 of the frame 12. Further, the posterior end 44 of the movable portion 32 can be positioned adjacent to an anterior end 46 of the stationary portion 30.

Figure 4A:
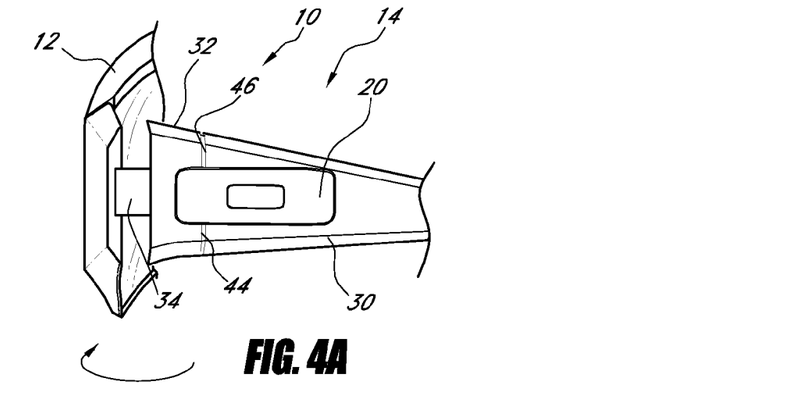
FIG. 4A is a left side view of the ear stem shown in FIG. 2 in a stowed position, in accordance with an embodiment.
Figure 4B:
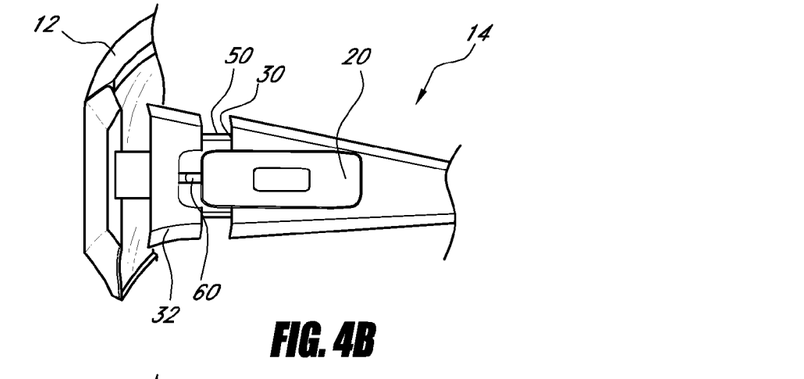
FIG. 4B is a left side view of the ear stem shown in FIG. 2 with a slidable portion of the ear stem being moved to an open position, in accordance with an embodiment.
Figure 4C:
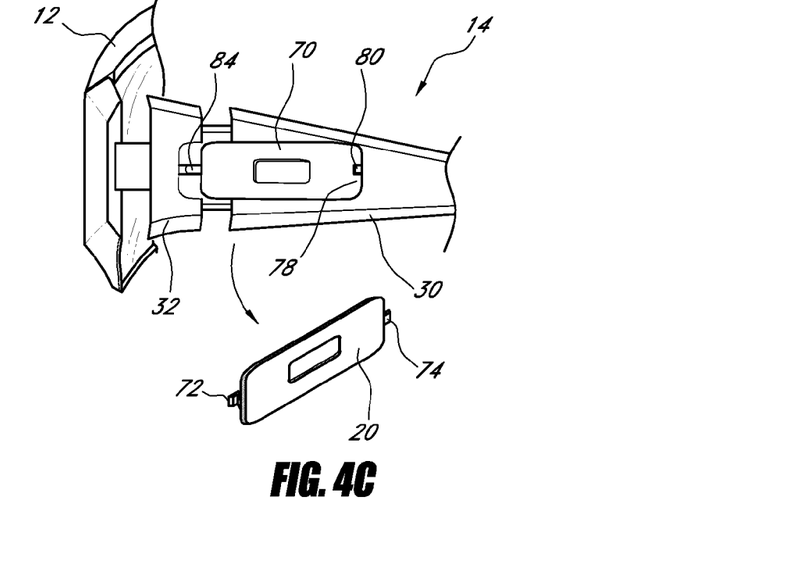
FIG. 4C is a left side view of the ear stem showed them FIG. 2 wherein a component has been removed from the ear stem, in accordance with an embodiment.

With reference now to FIGS. 4A-C, the mechanical operation of an embodiment will be described. FIGS. 4A-C illustrate the first ear stem 14 in a stowed or collapsed position. As is generally the case with other eyewear, the first ear stem 14 is moved to the stowed or collapsed position from a deployed position when the eyeglass 10 are not being used and/or are being stored. The deployed position is obtained when the first ear stem 14 is fully pivoted outwardly away from the second ear stem 16, and vice versa, such that the eyeglass 10 can be placed onto the head of the wearer. The stowed or collapsed position can be obtained at any other position other than the deployed position. In this regard, some embodiments disclosed herein allow for interchangeability of component(s) on the frame or ear stem when the ear stem is in a stowed or collapsed position, and allow for retention of the component(s) when the ear stem is in the deployed position. However, in other embodiments, it is contemplated that a component(s) may be interchangeable when the ear stem is in the deployed position. Further, in yet other embodiments, it is contemplated that a component(s) may be interchangeable when the ear stem is in either of the deployed or stowed positions.

FIG. 4A illustrates a first stage for removing or replacing the component 20 in the eyeglass 10. As shown, the decorative component 20 is attached or mounted to the first ear stem 14. The movable portion 32 is disposed in a retaining position in which the posterior end 44 of the movable portion 32 is positioned adjacent to the anterior end 46 of the (relatively) stationary portion 30.

In order to remove or replace the component 20, the movable portion 32 can be slid anteriorly along a sliding track or groove such as the backbone element 34 of the stationary portion 30. Thus, the movable portion 32 can be interconnected with the stationary portion 30 with a slideable interfit relationship to allow translation of the movable portion 32 in the anterior-posterior plane relative to the stationary portion 30. In this regard, as shown in FIG. 4B, the stationary portion 30 can comprise an engagement track 50 that extends from the anterior end 46 of the stationary portion 30. The engagement track 50 can provide upper and lower tracks on which the movable portion 32 can slide. For example, the movable portion 32 can comprise upper and lower grooves that receive the respective ones of the upper and lower tracks of the engagement track 50. Additionally, in some embodiments, translational movement of the movable portion 32 along the engagement track 50 can be limited by a stop element. For example, the stop element may be the posterior edge 40 of the frame 12. Alternatively, the component 20 may be locked into place or released by rotating a rotatable knob or other control to releasably engage component 20.

As seen in FIG. 4B, the movable portion 32 can be anteriorly translated or moved relative to the stationary portion 30 of the first ear stem 14 from the retaining position to a releasing position. When this is accomplished, an anterior end 60 of the component 20 can be exposed. In the embodiment illustrated in FIG. 4B, the anterior end 60 of the component 20 can comprise an engagement member. Although the engagement member can be any of a variety of interlock structures, including a protrusion or a recess, the engagement member shown in FIG. 4B is a tab extending anteriorly from the component 20.

Finally, a third stage for removing or replacing the component 20 is shown in FIG. 4C. As shown, the component 20 can be removed or released from the first ear stem 14 when the anterior end 60 of the component 20 is exposed. For example, when the movable portion 32 is in the releasing position, the component 20 can be inserted or removed from a cavity 70 of the first ear stem 14. Additionally, as noted above, the component 20 can comprise at least one engagement member. In the illustrated embodiment, the component 20 can comprise both an anterior engagement member 72 and a posterior engagement member 74. As noted above, although the anterior engagement member 72 and posterior engagement member 74 are shown as tabs or protrusions, it is also contemplated that these engagement members 72, 74 can be recesses or other structures configured to interact with a portion of the first ear stem 14.

Alternatively, any of a variety of releasable interlocking structures may be provided for releasably retaining the component 20 adjacent to the ear stem or within a cavity or compartment on the ear stem. For example, the component 20 can be provided with one or two or more hooks or tabs having an aperture there through. The component 20 is positioned on the ear stem and an axially movable push wire or other locking element is advanced through the aperture or hook thereby locking the component 20 into place. Axial movement of the locking wire may be linked to the pivotal movement of the ear stem about the hinge point at the frame, or may be independently activated such as by moving a slider switch or other control.

The embodiment of FIGS. 1-5C also illustrates that the component 20 can be securely retained by the first ear stem 14 through the interaction of the anterior engagement member 72 and the posterior engagement member 74 with corresponding features of the movable portion 32 and the stationary portion 30, respectively. In order to seat the component 20 within the compartment 70, the posterior engagement member 74 can be positioned within an aperture 80 at a posterior position along a posterior end 78 of the compartment 70. Further, the anterior engagement member 72 of the component 20 can be placed along or with in a groove or recess 84 of the first ear stem 14. For example, the groove 84 can be formed on the engagement track 50.

Once the component 20 is seated in the compartment 70, the movable portion 32 can be moved from the releasing position to the retaining position. Once in the retaining position, the anterior engagement member 72 can be secured intermediate the movable portion 32 and the engagement track of 50, thus preventing the anterior engagement member 72 from being removed from a groove 84. Further, the posterior engagement member 74 will likewise be retained within the aperture 80 and precluded from removal therefrom. As such, the component 20 can be retained by the first ear stem 14 when seated in the compartment 70 with the movable portion 32 disposed in the retaining position.

One of the many benefits and advantages of such an embodiment is that the component 20 is discreetly, yet securely retained by the first ear stem 14. Both the anterior engagement member 72 and the posterior engagement member 74 can be used to retain the component 20 while either is visible when the movable portion 32 is in the retaining position. In this regard, the wearer can interchange various decorative components, or in some embodiments, electronic components, while maintaining the superior aesthetic properties of the eyeglass 10. Moreover, when the first ear stem 14 is positioned in the deployed position, the movable portion 32 will be urged toward and kept in the retaining position. Thus, the component 20 will be securely retained during use of the eyeglass 10 even if the wearer does not fully move the movable portion 32 to the retaining position before moving the first ear stem 14 to the deployed position.

As noted above, one of the advantageous features of the embodiment illustrated in FIGS. 1-5C is that the movable portion 32 can be urged to its retaining position during use of the eyeglass 10, thereby ensuring that a component is retained on the ear stem. FIGS. 5A-C illustrate an aspect of such an embodiment. As shown therein, the interfaces between the frame 12 and the movable portion 32 can comprise one or more slanted surfaces that promote movement of the movable portion 32 toward the retaining position as the first ear stem 14 is moved to the deployed position.

For example, when the first ear stem 14 pivots outwardly towards a deployed position, the surface 40 can be configured to contact the anterior end 42 of the movable portion 32 such that the movable portion 32 is urged rearwardly relative to the stationary portion 30 of the first ear stem 14. In such an embodiment, at least one of the surface 40 and the end 42 can be slanted or curved. Thus, contact between the surface 40 and the end 42 (when the movable portion 32 is in the releasing position) can tend to produce longitudinal movement of the moveable portion 32 along the axis of the first ear stem 14 in a rearward direction. In this manner, when the wearer prepares the eyeglasses for use, deployment of the first ear stem 14 will cause the movable portion 32 to be positioned in a final or retaining position.

Accordingly, if the first ear stem 14 is moved from the stowed or collapsed position shown in FIG. 5C (wherein the movable portion 32 is in the releasing position) to the deployed position shown in FIG. 5A, the posterior surface 40 of the frame 12 can contact the anterior end 42 of the movable portion 32. As the first ear stem 14 continues to move toward the deployed position, the contact between the surface 40 and the anterior end 42 will tend to urge the movable portion 32 toward the retaining position. As noted above, once the first ear stem reaches the deployed position, the movable portion 32 will be maintained in the retaining position. Thus, even if the component 20 is not secured in place by the wearer's movement of the movable portion 32 toward the retaining position, the movement of the first ear stem 14 towards the deployed position will serve to urge the movable portion 32 towards the retaining position and secure the component 20 in place. Furthermore, once in the retaining position, the moveable portion 32 can be maintained in the retaining position by the surface 40 when the first ear stem 14 is in the deployed position.

Figure 6A:
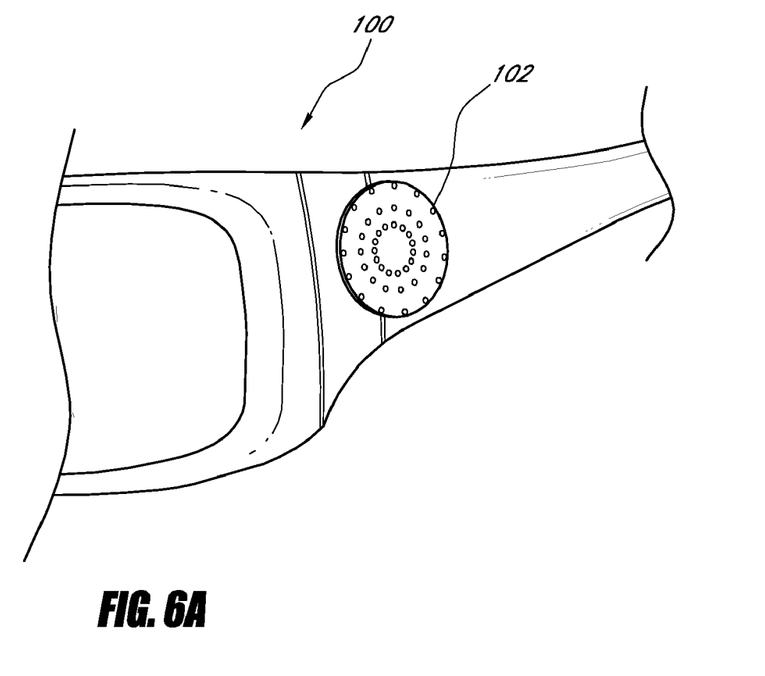
FIG. 6A is a perspective view of an alternative component that can be removably mounted onto an ear stem of an eyeglass, in accordance with another embodiment.
Figure 6B:
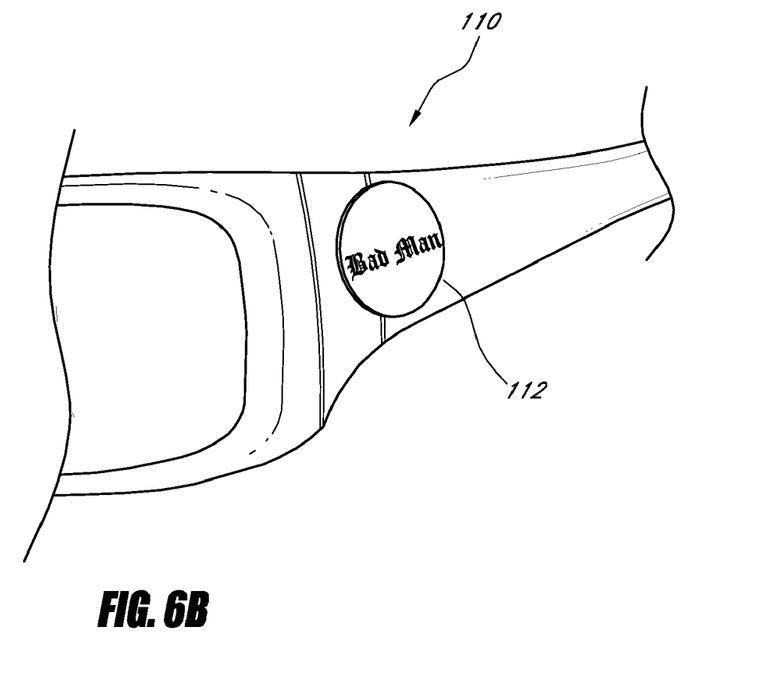
FIG. 6B is a perspective view of another alternative component that can be removably mounted onto an ear stem of an eyeglass, in accordance with yet another embodiment.

FIGS. 6A-B illustrate other types of decorative components that can be used in some embodiments. For example, the embodiment illustrated in FIG. 6A illustrates an eyeglass 100 comprising a decorative component 102. The decorative component 102 can comprise stones, gems, or other materials that can be interchanged to personalize the eyeglass 100. The embodiment of FIG. 6B illustrates an eyeglass 110 that comprises a decorative component 112. In such an embodiment, the decorative component 112 comprises a personalized plate with initials of the wearer. It is contemplated that various other designs can be provided which can be selected and personalized by the wearer.

Thus, the eyeglasses in accordance with the present invention may be provided in a kit or with an array of different decorative components 102 and 112. The wearer may advance the movable component or activate another control to release a first decorative component 102. The user may then select a second decorative component 112 such as from an array of decorative components. The user may then insert the decorative component 112 into the ear stem and activate the movable component or other control to lock the second decorative component 112 into position.

FIGS. 7A-D illustrate yet another embodiment of an eyeglass 120 comprising a frame 122 and a first ear stem 124. Such an embodiment can accommodate an electronically enabled component 126. The eyeglass 120 can comprise one or more electronic features that can interact with the electronic component 126. For example, the electronic component 126 can include a battery, a memory or storage module, a Bluetooth module, a microprocessor, or other electronic device.

Figures 7A, 7B:
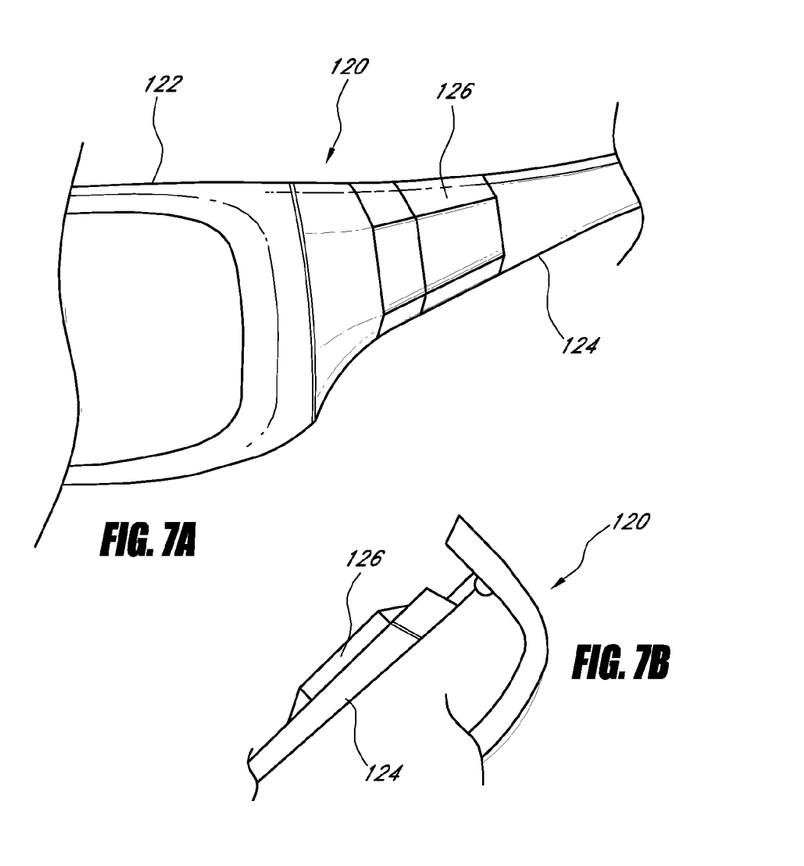
FIG. 7A is a perspective view of yet another component that can be removably mounted onto an ear stem of an eyeglass, in accordance with yet another embodiment.
FIG. 7B is a top view of the ear stem of the eyeglass shown in FIG. 7A.
Figure 7C:
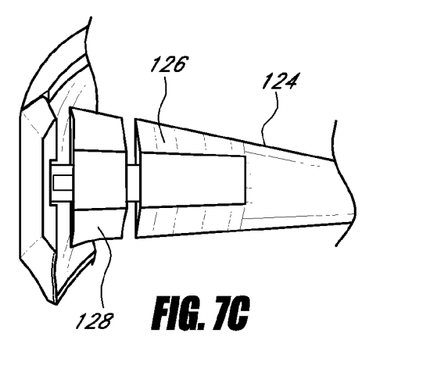
FIG. 7C is a left side view of the ear stem of the eyeglass shown in FIG. 7A, with a slidable portion of the ear stem being moved to an open position, in accordance with an embodiment.
Figure 7D:
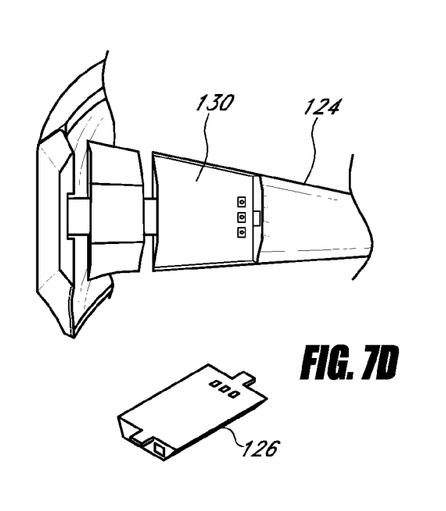
FIG. 7D is a left side view of the ear stem of the eyeglass shown them FIG. 7A, wherein the component has been removed from the ear stem, in accordance with an embodiment.

Similarly to the embodiment illustrated FIGS. 1-5C above, the electronic component 126 can be removable and replaceable from the first ear stem 124. For example, FIG. 7B illustrates that the first ear stem 124 can be moved to a stowed or collapsed position. FIG. 7C illustrates that a movable component 128 of the first ear stem 124 can be translated in an anterior direction in order to allow the electronic component 126 to be removed from the first ear stem 124. Finally, FIG. 7D illustrates that the electronic component 126 can be removed from a bay 130 formed in the first ear stem 124. As noted above, the electronic component 126 can also comprise one or more engagement structures that interact with corresponding engagement structures of the first ear stem 124 to retain the electronic component 126 in the bay 130 of the first ear stem 124.

Figure 8:
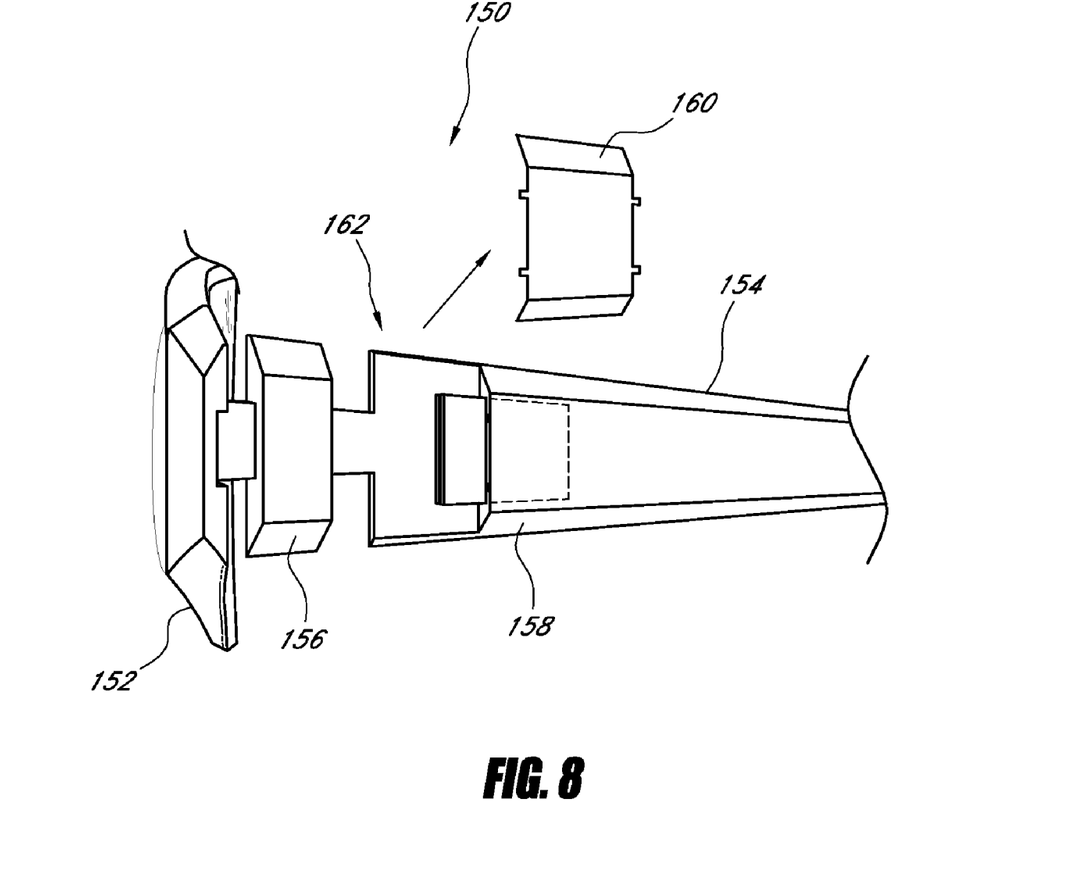
FIG. 8 is a side view of an ear stem of an eyeglass having a slidable portion and a removable portion that permit access to a component mounted on the ear stem, in accordance with yet another embodiment.

Referring now to FIG. 8, yet another embodiment of the eyeglass is shown. An eyeglass 150 is illustrated which comprises a frame 152 and a first ear stem 154. In this embodiment, the first ear stem comprises a movable portion 156 and a stationary portion 158. Similar to the embodiments discussed above, the movable portion 156 can slide relative to the stationary portion 158. In this regard, the eyeglass 150 can comprise a cover component 160. The cover component 160 can be retained by the first ear stem 154, as similarly discussed with respect to other embodiments above. However, in the embodiment of FIG. 8, the cover component 160 can be removed to expose one or more electronic devices or other objects disposed within a cavity 162 of the first ear stem 154.

The cavity 162 of the first earstem 154 can house electronic devices such as memory cards, batteries, microchips, or any other variety of electronic components or devices. The eyeglass 150 can thereby allow the wearer to modify one or more electronic features of the eyeglass 150. Further, as with the other embodiments discussed above, when the first ear stem 154 is moved to a deployed position, the movable portion 156 will be urged toward and/or maintained at a retaining position. In this regard, the cover component will be secured on the first ear stem 154.

Figure 9A:
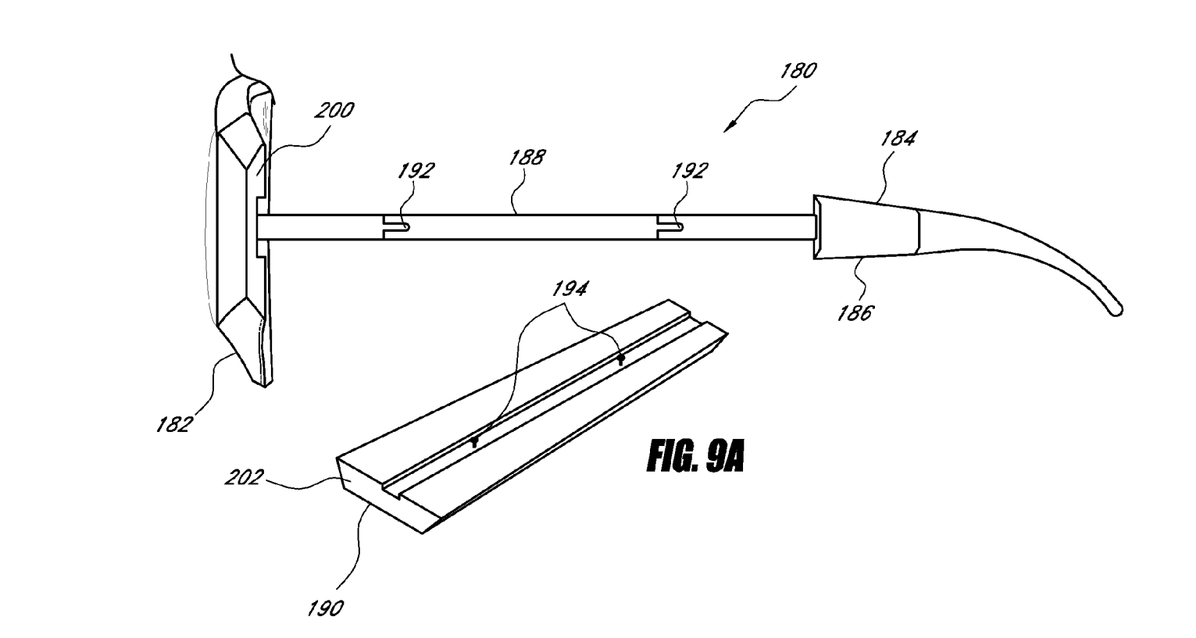
FIG. 9A is a side view of an ear stem of an eyeglass having a removable portion that can be seated onto a backbone element of the ear stem, in accordance with yet another embodiment.

In accordance with yet another embodiment, FIG. 9A illustrates an eyeglass 180 comprising a frame 182 and a first ear stem 184. In this embodiment, the first ear stem 184 can comprise an optional stationary portion 186 and a backbone element 188. Further, the eyeglass 180 can comprise one or more modules 190. The module 190 can be an electronic component or decorative component.

Figure 9B:
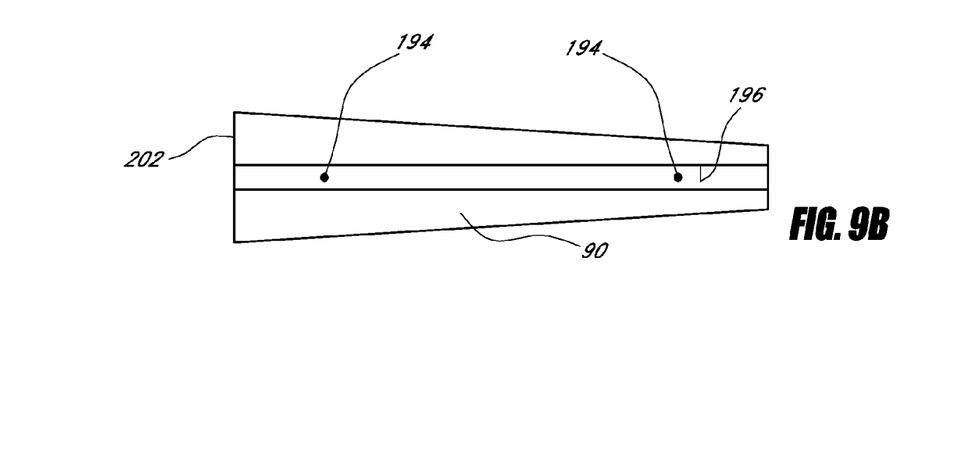
FIG. 9B is a bottom view of the removable portion of the eyeglass shown in FIG. 9A, in accordance with an embodiment.

As shown in FIG. 9A, the backbone element 188 can comprise one or more engagement elements 192. The engagement elements 192 can comprise one or more slots, grooves, or protrusions. In the illustrated embodiment, the engagement elements 192 can each comprise a raised slot with one open end or a keyhole configuration configured to receive a corresponding protrusion of the module 190. FIG. 9B is a bottom view of the module 190 illustrating a pair of engagement elements 194. Engagement elements may comprise a nail head configuration, with a shaft and a transversely enlarged head spaced apart from the module 190 by the shaft. As shown, the engagement elements 194 can be disposed in a longitudinal slot 196 formed in the module 190. The slot 196 can be formed on an underside or bottom side of the module 190.

In use, the engagement elements 194 of the module 190 can be aligned with the engagement elements 192 of the backbone element 188. Once aligned, the engagement elements 194 can be inserted into the slots of the engagement elements 192 and the module 190 can be moved posteriorly along the backbone element 188 until the engagement elements 194 are secured by the engagement elements 192, and the module is properly seated with respect to the stationary portion 186.

For example, in some embodiments, the engagement elements 192 can comprise a tapered slot or a bump that tends to engage the engagement elements 194. Further, as similarly discussed above with respect to other embodiments disclosed herein, movement of the first ear stem 184 to the deployed position will cause a posterior surface 200 of the frame 182 to contact an anterior end 202 of the module 190. In this manner, the module 190 will be urged posteriorly such that the engagement elements 194 are retained within the engagement elements 192. Accordingly, the module 190 can be securely retained on the first ear stem 184 during use of the eyeglass 180.

The module 190 may alternatively be releasably retained on the ear stem utilizing any of the retention structure is previously described herein. In general, the module 190 or other releasable complement will have at least one and preferably two engagement surfaces which may be releasably engaged with corresponding complementary engagement surfaces carried by the ear stem.

The module 190 may have an axial length that is at least about 25%, in some embodiments at least about 50%, and in other embodiments as much as 75% or more of the overall length of the ear stem. The module 190 may comprise any of a variety of decorative patterns, structures, sculptures, colors or other decorative features. Module 190 may additionally contribute structural integrity to the ear stem, such that the backbone element 188 in combination with the module 190 provide the finished support. Module 190 may be provided in a releasable configuration, to permit the wearer to remove and replace the module. Alternatively, module 190 may be assembled onto the ear stem at the point of manufacture of the eyeglass, and secured there to such as by thermal bonding, adhesive bonding, welding, screws, or other attachment technique. In this manner, the present invention provides a method of manufacturing an eyeglass in which a common frame may be utilized to support a wide variety of different decorative implementations of the invention. The decorative component may be added to the eyeglass, and secured thereto, at the point of manufacture, in a manner that does not permit disassembly under normal use conditions.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An eyeglass component mounting system comprising:
a frame defining at least one lens support;
at least a first lens supported by the lens support; and
at least a first ear stem extending rearwardly from the frame, the first ear stem defining an anterior end and a posterior end, the anterior end of the first ear stem being hingedly coupled to the frame, the first ear stem being movable between a stowed position and a deployed position, the first ear stem comprising a mounting area configured to receive an eyewear component thereon such that the eyewear component can be removed or seated onto the mounting area when the first ear stem is in the stowed position and such that the eyewear component is retained on the mounting area when the first ear stem is in the deployed position;
wherein the first ear stem comprises a movable portion, the movable portion being attached to the first ear stem and being translatable along the first ear stem to define an open configuration and a closed configuration, the open configuration facilitating seating of the eyewear component onto the mounting area and the closed configuration providing retention of the eyewear component in the mounting area.

2. The eyeglass component mounting system of claim 1, further comprising an eyewear component.

3. The eyeglass component mounting system of claim 2, wherein the eyewear component comprises a decorative ornament.

4. The eyeglass component mounting system of claim 2, wherein the eyewear component comprises an electronic module.

5. The eyeglass component mounting system of claim 4, wherein the electronic module comprises at least one of a memory storage module, a battery, and a transceiver.

6. The eyeglass component mounting system of claim 2, wherein an anterior end of the eyewear component abuts the frame when the first ear stem is in the deployed position such that the eyewear component is retained on the first ear stem.

7. The eyeglass component mounting system of claim 6, wherein the eyewear component comprises an engagement portion and the first ear stem comprises an engagement structure, the engagement portion of the eyewear component being interconnectable with the engagement structure of the first ear stem when the first ear stem is in the stowed position, the engagement portion being slidable along the first ear stem in a posterior direction until engaging the engagement structure of the first ear stem and being releasable from the engagement structure upon anterior movement along the first ear stem.

8. The eyeglass component mounting system of claim 1, wherein the mounting area of the first ear stem comprises an engagement structure, the engagement structure being configured to interconnect with a portion of the eyewear component when the eyewear component is seated onto the mounting area.

9. The eyeglass component mounting system of claim 1, further comprising an eyewear component wherein the eyewear component is a cover configured to enclose a compartment formed along the first ear stem.

10. The eyeglass component mounting system of claim 1, wherein the moveable portion is maintained in the locking position when the ear stem is in the deployed position.

11. The eyeglass component mounting system of claim 10, wherein the moveable portion comprises an engagement surface and the frame comprises an abutment surface, the engagement surface contacting the abutment surface to maintain the moveable portion in the locking position when the ear stem is in the deployed position.

12. The eyeglass component mounting system of claim 11, wherein the moveable portion is configured with the engagement surface contacting the abutment surface when the moveable portion is in the releasing position and the ear stem is in the stowed position.

13. The eyeglass component mounting system of claim 12, wherein upon movement of the ear stem from the stowed position to the deployed position, the engagement surface contacts the abutment surface such that the moveable portion is urged from the releasing position toward the locking position.

14. The eyeglass component mounting system of claim 1, wherein the moveable portion is slidable relative to the ear stem.

15. The eyeglass component mounting system of claim 14, wherein the stationary portion is attached to the frame.

16. The eyeglass component mounting system of claim 15, wherein the stationary portion comprises a backbone element being attached to the frame, the backbone element engaging the moveable portion of the ear stem for permitting slidable movement of the moveable portion relative to the stationary portion of the ear stem.

17. The eyeglass component mounting system of claim 1, wherein the moveable component is slidable relative to the ear stem.

18. An eyeglass for releasably mounting an eyewear component thereon, the eyeglass comprising:
a frame; and
at least one ear stem coupled to the frame, the ear stem comprising a first portion being attached with the frame and a second portion, the second portion being moveable relative to the first portion between a locking position and a releasing position for engaging or releasing the eyewear component;

wherein the second portion of the ear stem is maintained in the locking position when the ear stem assumes a deployed position such that the second portion of the ear stem engages and retains the eyewear component relative to the ear stem, and wherein the second portion of the ear stem is movable to the releasing position when the ear stem assumes a stowed position such that the eyewear component can be removed.

19. The eyeglass of claim 18, wherein the second portion comprises an engagement surface and the frame comprises an abutment surface, the engagement surface contacting the abutment surface to maintain the second portion in the locking position when the ear stem is in the deployed position.

20. The eyeglass of claim 19, wherein upon movement of the ear stem from the stowed position to the deployed position, the engagement surface is configured to contact the abutment surface such that the second portion is urged from the releasing position toward the locking position.

21. The eyeglass of claim 18, wherein the second portion is slidable relative to the ear stem.

22. The eyeglass of claim 21, wherein the first portion is pivotally attached to the frame.

23. The eyeglass of claim 22, wherein the first portion comprises a backbone element, wherein the second portion of the ear stem is configured to engage with the backbone element for permitting slidable movement of the second portion relative to the first portion of the ear stem.

24. The eyeglass of claim 18, wherein the first portion and the second portion each comprise an engagement element and the eyewear component further comprises engagement elements, the engagement elements of the first portion and the second portion being configured to engage the engagement elements of the eyewear component to retain the eyewear component relative to the ear stem.

25. The eyeglass of claim 18, further comprising an eyewear component.

26. The eyeglass of claim 18, wherein the ear stem of the eyeglass is configured to receive an electronic component.

27. An eyeglass comprising:
a frame; and
at least one ear stem coupled to the frame, the ear stem comprising:
a mounting area configured to receive an eyewear component thereon;
a first portion being attached with the frame; and
a second portion being moveable relative to the first portion and the mounting area of the ear stem, the second portion being positionable in a locking position for retaining the eyewear component relative to the mounting area, the second portion further being positionable in a releasing position for permitting removal of the eyewear component from the mounting area.

28. The eyeglass of claim 27, wherein the second portion of the ear stem is maintained in the locking position when the ear stem assumes a deployed position.

29. The eyeglass of claim 27, wherein the second portion is slidable relative to the ear stem.

30. The eyeglass of claim 27, wherein the first portion comprises a backbone element, and the second portion of the ear stem is configured to engage with the backbone element for permitting slidable movement of the second portion relative to the first portion of the ear stem.

31. The eyeglass of claim 27, wherein the first portion and the second portion each comprise an engagement element and the eyewear component further comprises engagement elements, the engagement elements of the first portion and the second portion being configured to engage the engagement elements of the eyewear component to retain the eyewear component relative to the ear stem.

32. The eyeglass of claim 27, further comprising an eyewear component.

33. The eyeglass of claim 27, wherein the ear stem of the eyeglass is configured to receive an electronic component.

* * * * *